(12) United States Patent
Chang et al.

(10) Patent No.: US 10,042,448 B1
(45) Date of Patent: Aug. 7, 2018

(54) TOUCH MODULE FOR PREVENTING SEPARATION OF SILVER PASTE BETWEEN LASER ETCHING TRACES AND METHOD OF MANUFACTURE

(71) Applicants: Interface Technology (ChengDu) Co., Ltd., Chengdu, Sichuan (CN); Interface Optoelectronics (ShenZhen) Co., Ltd., Shenzhen (CN); General Interface Solution Limited, Miaoli County (TW)

(72) Inventors: Hsuan-Man Chang, Miaoli County (TW); Po-Lin Chen, Miaoli County (TW); Ya-Yin Cheng, Miaoli County (TW); Chia-Chi Yeh, Miaoli County (TW)

(73) Assignees: INTERFACE TECHNOLOGY (CHENGDU) CO., LTD., Chengdu, Sichuan (CN); INTERFACE OPTOELECTRONICS (SHENZHEN) CO., LTD., Shenzhen (CN); GENERAL INTERFACE SOLUTION LIMITED, Miaoli County (TW)

( * ) Notice: Subject to any disclaimer, the term of this patent is extended or adjusted under 35 U.S.C. 154(b) by 0 days.

(21) Appl. No.: 15/676,128

(22) Filed: Aug. 14, 2017

(30) Foreign Application Priority Data

Jul. 5, 2017 (CN) .......................... 2017 1 0545965

(51) Int. Cl.
*G06F 3/041* (2006.01)
(52) U.S. Cl.
CPC .... *G06F 3/041* (2013.01); *G06F 2203/04103* (2013.01)
(58) Field of Classification Search
CPC .............................. G06F 3/041; G06F 3/0416
USPC .................................................. 345/173, 174
See application file for complete search history.

*Primary Examiner* — Calvin C Ma
(74) *Attorney, Agent, or Firm* — Tim Tingkang Xia, Esq.; Locke Lord LLP

(57) ABSTRACT

A touch module for preventing separation of silver paste between laser etching traces, comprises a substrate, a plurality of touch electrodes, and a silver paste. A side of the touch electrode has a pin area. The pin area contains a plurality of perforations. The silver paste is coated on the substrate and the pin area for connecting electrical circuitry between the pin area and the connection line area. Wherein the silver paste on the pin area flows into the perforations and connects to the substrate. Therefore separation of the silver paste on the pin area and touch electrodes will less likely occur due to minor coating errors. The present invention also provides a manufacturing method of a touch module that prevents separation of the silver paste between laser etching traces.

10 Claims, 7 Drawing Sheets

TOUCH MODULE FOR PREVENTING SEPARATION OF SILVER PASTE BETWEEN LASER ETCHING TRACES AND METHOD OF MANUFACTURE

CROSS REFERENCE

This non-provisional application claims priority from China Patent Application NO. 201710545965.2 filed on Jul. 5, 2017, the content thereof is incorporated by reference herein.

BACKGROUND OF THE INVENTION

Field of the Invention

The present invention relates to a touch module and, more particularly, to a touch module with perforations at a touch electrode for preventing separation of silver paste between laser etching traces.

Description of the Prior Art

Touch-sensitive technology has developed rapidly and utilized in many consumer electronics products such as mobile phones, GPS navigator systems, tablet PCs, and notebook computers etc.

Screen printing is a common method for manufacturing a touch module. The method involves coating silver paste on the substrate and laser etching a trace on the silver paste to create a silver paste trace.

Referring to FIG. 1A, FIG. 1B, FIG. 2A and FIG. 2B, common materials used for a touch module include: a PET (polyethylene terephthalate) substrate 2a, an ITO touch electrode 3a that bonds on the substrate 2a, and silver paste traces 41a and laser etching traces 42a formed by utilizing laser etching of the silver paste. A side of the touch electrode 3a having a pin area 31a provides the advantage of locating the precise location for the screen printing of the silver paste. The pin area 31a electrically connects with a connection line area 22a of the substrate 2a via the silver paste trace 41a, so that the touch electrode 3a may transmits a touch signal to the connection line area 22a.

In an ideal state, the screen printing allows stabilization of the substrate silver paste 4a precisely distributed on the substrate 2a and the pin area 31a. During the laser etching, the laser will not etch the touch electrode 3a due to the precise positioning. Therefore, providing stronger bonds to reduce separation of the silver paste 4a and the substrate 2a. During actual operation, errors due to positioning might result in coating the silver paste 4a on the function area 32a of the touch electrode 3a. Proper positioning for laser etching depends on the location of the coated silver plate, therefore, improper coating of the silver paste might result in etching of the touch electrode 3a. Separation of the silver paste 4a and ITO might occur due to lack of bonds and results in malfunctions.

SUMMARY OF THE INVENTION

To solve the above problems and improve the quality of bonding, the present invention provides a touch module that reduces separation of silver paste and a touch electrode when a positioning error occurs.

In order to achieve the above and other objectives, the present invention provides a touch module for preventing separation of silver paste between laser etching traces, comprising: a substrate, a plurality of touch electrodes, and a silver paste. The substrate comprises a touch area and a connection line area. The touch electrodes are disposed on the touch area. The touch electrode has a pin area on a side of the touch electrode and containing a plurality of perforations. The silver paste is coated on the substrate and the pin area of the touch electrode for connecting electrical circuitry between the pin area and the connection line area. The silver paste comprises a plurality of silver paste traces and a plurality of laser etching traces. Between the silver paste traces, there is one of the laser etching traces for preventing a short circuit of touch electrodes. Wherein the silver paste on the pin area flows into the perforations to connect to the substrate.

In a preferred embodiment of the present invention, a length of the pin area is less than the side of the touch electrode.

In a preferred embodiment of the present invention, the touch electrode is an ITO transparent electrode.

In a preferred embodiment of the present invention, an area of the perforations consists of between twenty to fifty percent of the pin area.

In a preferred embodiment of the present invention, a shape of the perforations on the pin area can be one of the following: triangular, quadrangular, polygonal, or circular.

In a preferred embodiment of the present invention, a shape of the perforations on the pin area consists of a combination of following shapes: triangular, quadrangular, polygonal, or circular.

The present invention also provides a manufacturing method of a touch module that prevents separation of the silver paste between laser etching traces, comprising the steps of: (a) providing a substrate and a plurality of touch electrodes, the substrate having a touch area and a connection line area, a side of the touch electrode having a pin area, the pin area containing a plurality of perforations. (b) bonding the touch electrode on the touch area, the touch electrodes lining up with the same orientation to make the pin areas of the touch electrodes line up on the same side. (c) coating a silver paste on the substrate and the pin area of the touch electrode, the silver paste connecting electrical circuitry between the pin area and the connection line area. (d) the silver paste on the pin area flowing into the perforations to connect to the substrate. (e) creating a plurality of silver paste traces via cutting the silver paste, the adjacent silver paste traces having a laser etching trace, and the silver paste on the pin area is not separated from the touch electrode.

In a preferred embodiment of the present invention, the step (e) further comprises laser etching the silver paste to create the silver paste traces.

In a preferred embodiment of the present invention, a shape of the perforation on the pin area can be one of the following: triangular, quadrangular, polygonal, or circular.

DETAILED DESCRIPTION OF THE EMBODIMENTS

Features and functions of the technical means and structures applied to the present invention to achieve the aforesaid objectives and effects are depicted by drawings, illustrated with preferred embodiments, and described below so as to be fully comprehensible but not restrictive of the present invention.

Figure 1A:
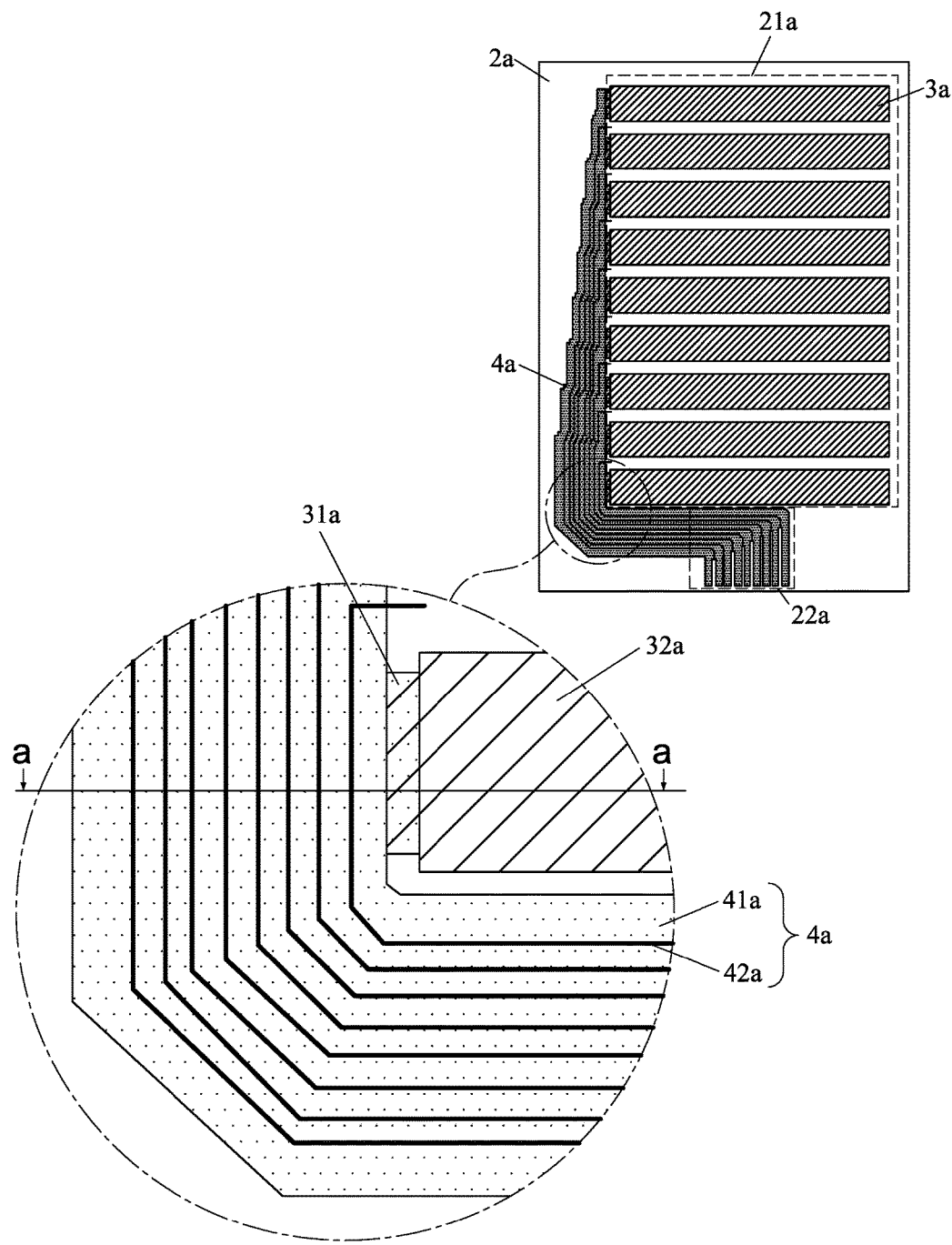
FIG. 1A is a schematic view of a touch module in an ideal state.
Figure 1B:
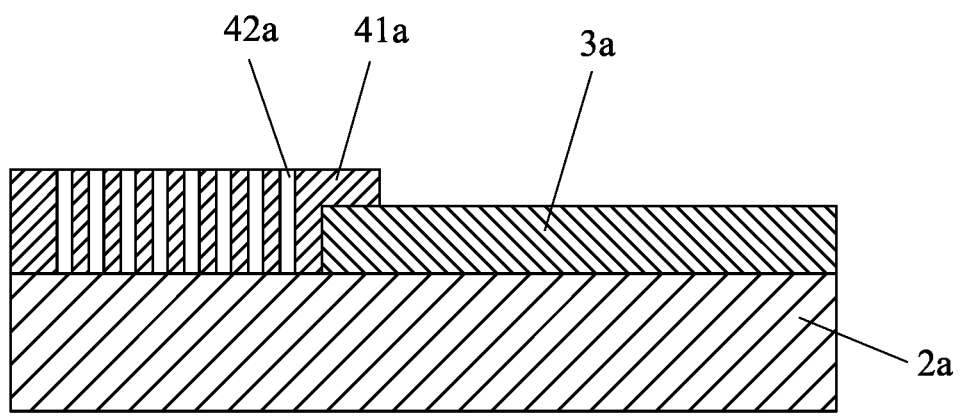
FIG. 1B is an a-a sectional view of a touch module in an ideal state.
Figure 2A:
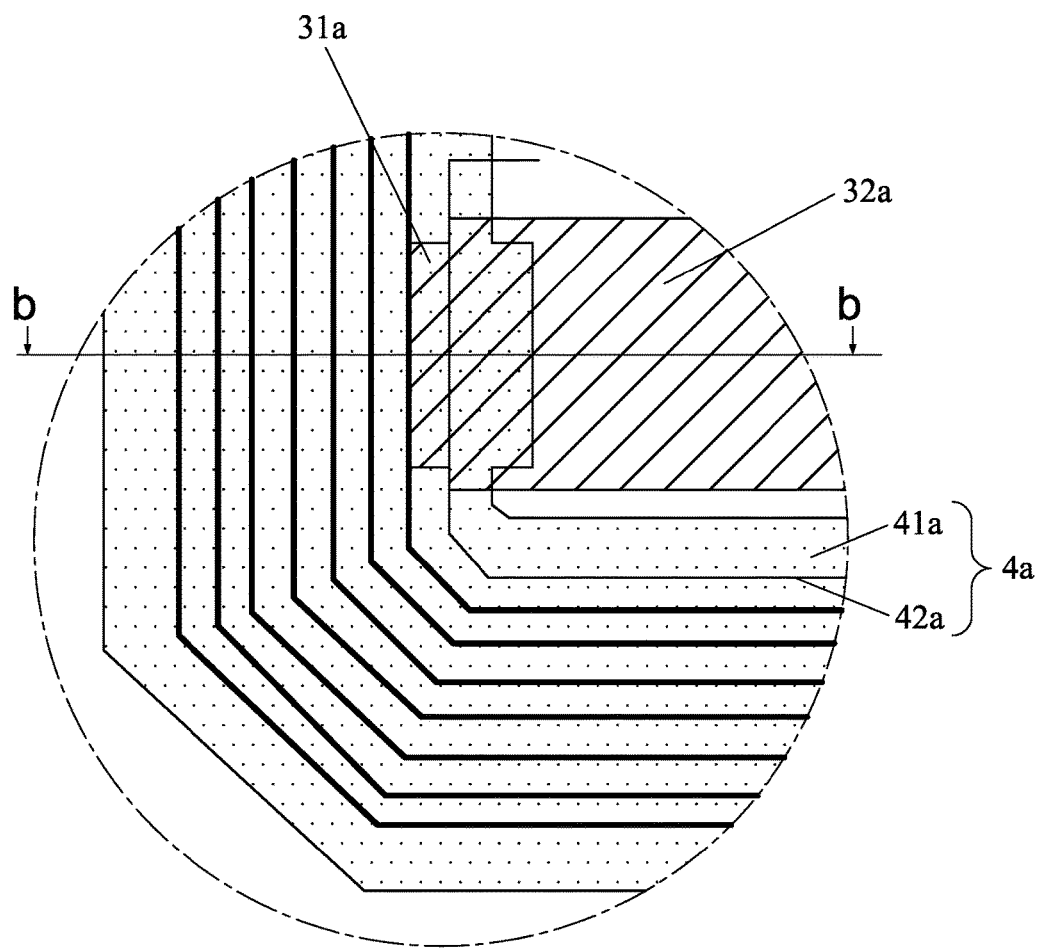
FIG. 2A is a schematic view of a touch module in a non-ideal state.
Figure 2B:
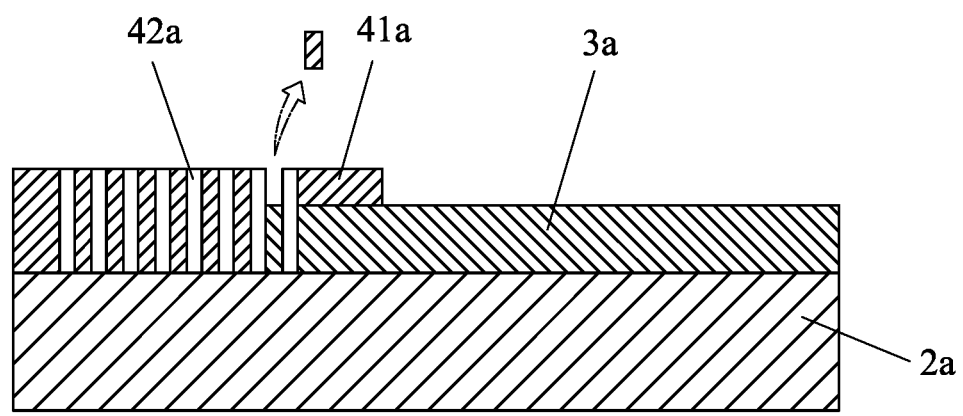
FIG. 2B is an a-a sectional view of a touch module in a non-ideal state.
Figure 3A:
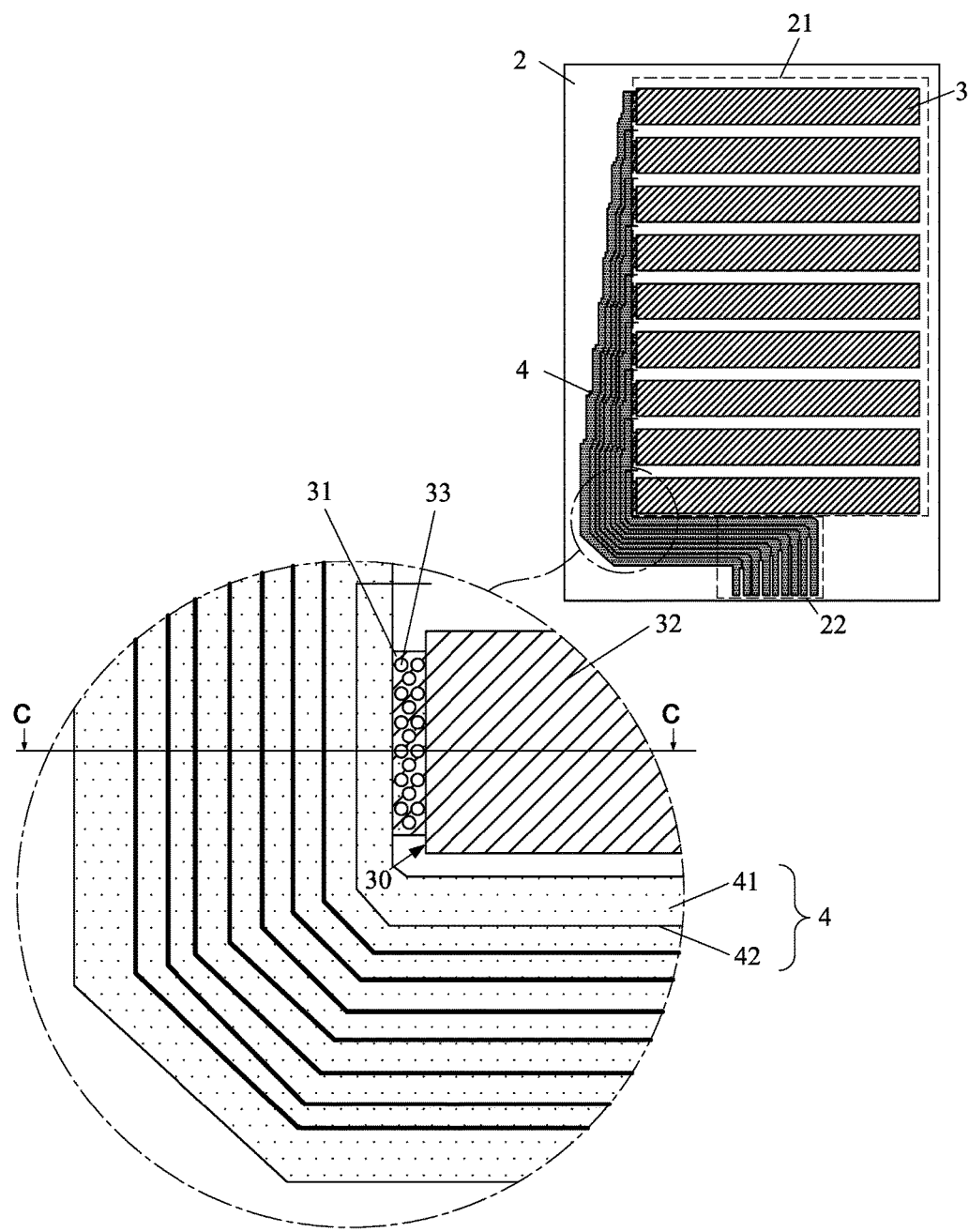
FIG. 3A is a schematic view of a touch module for preventing separation of silver paste between laser etching traces and a method of manufacture of the present invention.
Figure 3B:
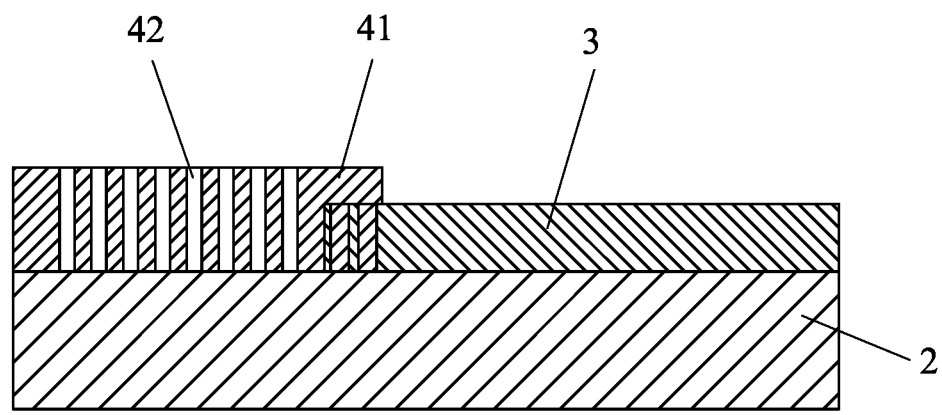
FIG. 3B is an a-a sectional view of a touch module for preventing separation of silver paste between laser etching traces and a method of manufacture of the present invention.

Referring to FIG. 3A and FIG. 3B, which illustrate a schematic view and an a-a sectional view of a touch module for preventing separation of silver paste between laser etching traces and a method of manufacture of the present invention. The present invention provides a touch module 1 for preventing separation of silver paste between laser etching traces, comprising: a substrate 2, a plurality of touch electrodes 3, and a silver paste 4.

The substrate 2 preferably can be made of PET (polyethylene terephthalate) material. PET is an organic insulating material while having good light penetration, a low thermal expansion coefficient, and a low price. PET is an excellent selection of material for the substrate. The substrate 2 comprises a touch area 21 and a connection line area 22.

The touch electrode 3 can be made of a transparent electro conductive material, for example, a metal doping oxide, a carbon nanotube, an electrode type conductive polymer composites, or a grapheme. The metal doping oxide may be indium tin oxide (ITO), indium zinc oxide (IZO), gallium-doped zinc oxide (GZO), aluminum-doped zinc oxide (AZO) in one or more of them. In a preferred embodiment, the touch electrode 3 is ITO organic electronic. ITO organic electronic is a widely used transparent conductive material because it has a low resistance ratio and a high light transmittance with high durability and is a widely used transparent conductive material.

The plurality of touch electrodes 3 is disposed on the touch area. The touch electrode has a pin area 31 and a function area 32. The pin area 31 on a side 30 of the touch electrode 3. Preferably, a length of the pin area 31 is less than the side 31 of the touch electrode 3 for easily positioning of equipment. The pin area 31 contains a plurality of perforations 33. A shape of the perforations 33 on the pin area 31 can be one of the following: triangular, quadrangular, polygonal, or circular.

In an embodiment of the present invention, a shape of the perforation 33 on the pin area 31 consists of a combination of the following shapes: triangular, quadrangular, polygonal, or circular.

In an embodiment of the present invention, an area of the perforations 33 consists of between twenty to fifty percent of the pin area 31.

Screen printing is a common method for manufacturing the touch module. The method involves coating silver paste on the substrate and laser etching traces on the silver paste to create silver paste traces. In a preferred embodiment, the silver paste 4 is coated on the substrate 2 and the pin area 31 of the touch electrode 3. The silver paste 4 is used for connecting electrical circuitry between the pin area 31 and the connection line area 22. The silver paste 4 comprises a plurality of silver paste traces 41 and a plurality of laser etching traces 42. Between the silver paste traces 41, there is one of the laser etching traces 42 for preventing a short circuit of touch electrodes 3. Laser etching traces 42 are created by laser etching of the silver paste 4. The laser etching traces 42 separate the silver paste traces 41 and prevent a short circuit of touch electrodes 3.

According to the above configuration, even if positioning errors result in coating silver paste 4 on the function area 32 of the touch electrode 3, and improper coating of the silver paste might result in etching of the touch electrode 3. The perforations 33 on the pin area 31 allow silver paste 4 to penetrate and connect to the substrate 2. Separation of the silver paste 4 on the pin area 31 and touch electrodes 3 will less likely occur.

Figure 4:
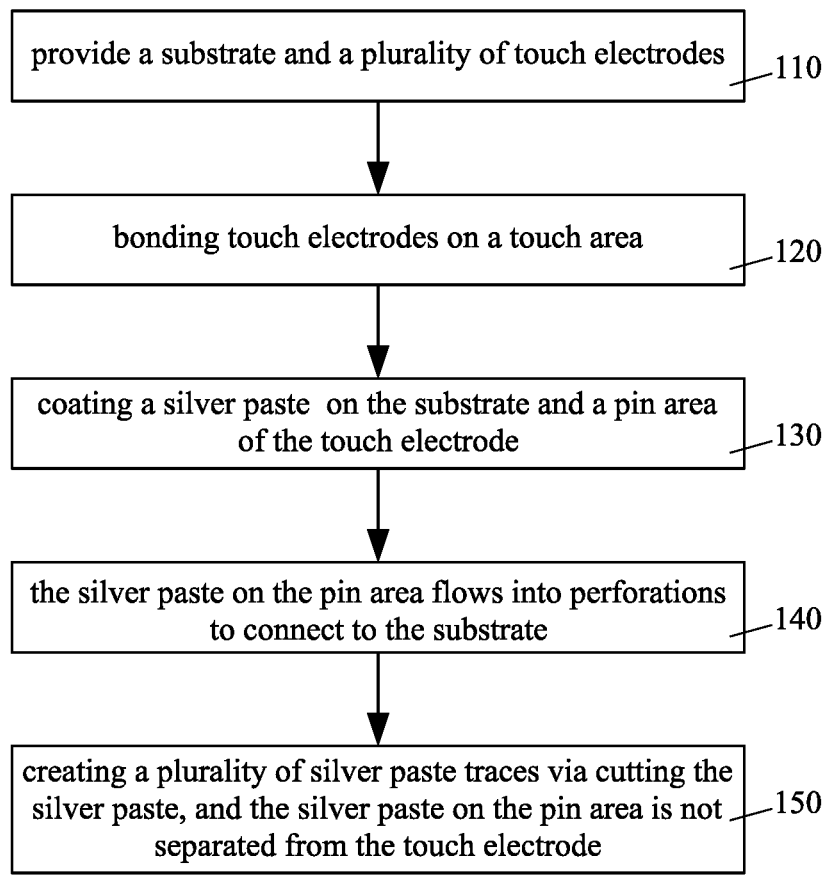
FIG. 4 is a flowchart of a manufacturing method of a touch module that prevents separation of the silver paste between laser etching traces.

Referring to FIG. 4, which illustrates a flowchart of a manufacturing method of a touch module that prevents separation of the silver paste between laser etching traces. The present invention also provides a manufacturing method of a touch module that prevents separation of the silver paste between laser etching traces, comprising the steps of:

Step 110: provide a substrate 2 and a plurality of touch electrodes 3. The substrate 2 and the touch electrodes 3 mentioned in the above embodiment are provided. The substrate 2 has a touch area 21 and a connection line area 22. A side 30 of the touch electrode 3 has a pin area 31. The pin area 31 contains a plurality of perforations 33. An area of the perforations 33 consists of between twenty to fifty percent of the pin area 31.

Step 120: bonding the touch electrodes 3 on the touch area 21. The touch electrodes 3 lining up with the same orientation to make the pin areas 31 of the touch electrodes 3 line up on the same side.

Step 130: coating a silver paste 4 on the substrate 2 and the pin area 31 of the touch electrode 3. Utilizing a screen printing method to coat the silver paste 4 on the substrate 2 and the pin area 31, the silver paste 4 may connect electrical circuitry between the pin area 31 and the connection line area 22.

Step 140: the silver paste 4 on the pin area 31 flows into the perforations 33 to connect to the substrate 2.

Step 150: creating a plurality of silver paste traces 41 via cutting the silver paste 4, and the silver paste 4 on the pin area 31 is not separated from the touch electrode 3. Utilizing laser etching technology to create silver paste traces 41 via laser etching the silver paste 4. The adjacent silver paste traces 41 have a laser etching trace 42. Perforations 33 on the pin area 31 allow silver paste 4 to penetrate and connect to the substrate 2. Separation of the silver paste 4 on the pin area 31 and touch electrodes 3 will less likely occur due to minor coating errors.

In conclusion, the present invention provides a touch module for preventing separation of silver paste between laser etching traces and a method of manufacture. The present invention will increase product performance by creating perforations on the pin area of the electrode. The perforations allow silver paste to connect with the substrate to help reduce separation of the silver paste and the touch electrode.

What is claimed is:

1. A touch module for preventing separation of silver paste between laser etching traces, comprising:
    a substrate, comprising a touch area and a connection line area;

a plurality of touch electrodes, disposed on the touch area, the touch electrode having a pin area, the pin area on a side of the touch electrode and containing a plurality of perforations; and a silver paste, coated on the substrate and the pin area of the touch electrode, for connecting electrical circuitry between the pin area and the connection line area, the silver paste comprising a plurality of silver paste traces and a plurality of laser etching traces, between silver paste traces, there is one of the laser etching traces for preventing a short circuit of touch electrodes;

wherein the silver paste on the pin area flows into perforations to connect to the substrate.

2. The touch module of claim 1, wherein a length of the pin area is less than the side of the touch electrode.

3. The touch module of claim 1, wherein the touch electrode is indium tin oxide (ITO) transparent electrode.

4. The touch module of claim 1, wherein an area of the perforations consists of between twenty to fifty percent of the pin area.

5. The touch module of claim 1, wherein a shape of the perforation on the pin area can be one of the following: triangular, quadrangular, polygonal, or circular.

6. The touch module of claim 1, wherein a shape of the perforation on the pin area consists of a combination of following shapes: triangular, quadrangular, polygonal, or circular.

7. A manufacturing method of a touch module that prevents separation of silver paste between laser etching traces, comprising the steps of:

(a) providing a substrate and a plurality of touch electrodes, the substrate having a touch area and a connection line area, a side of the touch electrode having a pin area, the pin area containing a plurality of perforations;

(b) bonding the touch electrodes on the touch area, the touch electrodes lining up with the same orientation to make the pin areas of the touch electrodes line up on the same side;

(c) coating a silver paste on the substrate and the pin area of the touch electrode, the silver paste connecting electrical circuitry between the pin area and the connection line area;

(d) the silver paste on the pin area flowing into the perforations to connect to the substrate;

(e) creating a plurality of silver paste traces via cutting the silver paste, the adjacent silver paste traces having a laser etching trace, and the silver paste on the pin area is not separated from the touch electrode.

8. The method of claim 7, step (e) further comprising:
laser etching the silver paste to create the silver paste traces.

9. The method of claim 7, wherein an area of the perforation consists of between twenty to fifty percent of the pin area.

10. The method of claim 7, wherein a shape of the perforation on the pin area can be one of the following: triangular, quadrangular, polygonal, or circular.

\* \* \* \* \*